June 16, 1931. C. R. BERRY 1,810,411
COTTON PICKER
Filed July 27, 1928 2 Sheets-Sheet 2
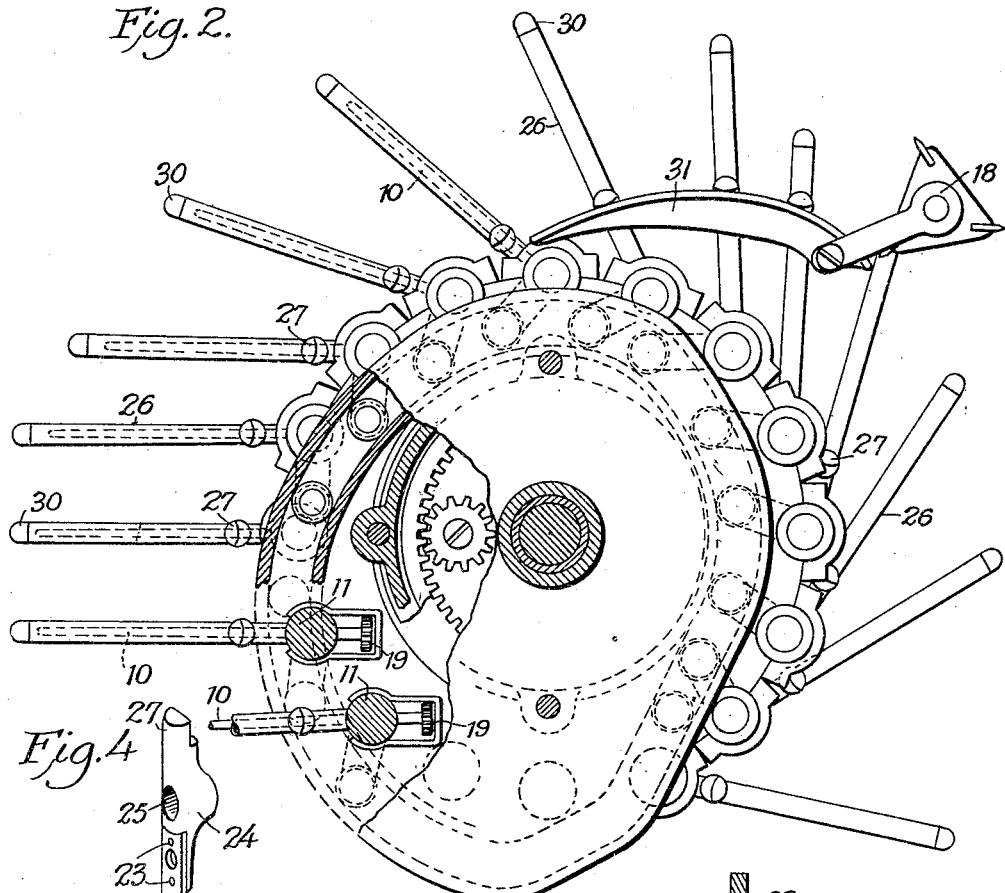
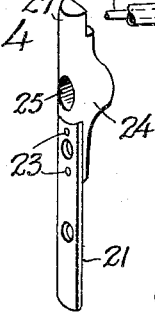
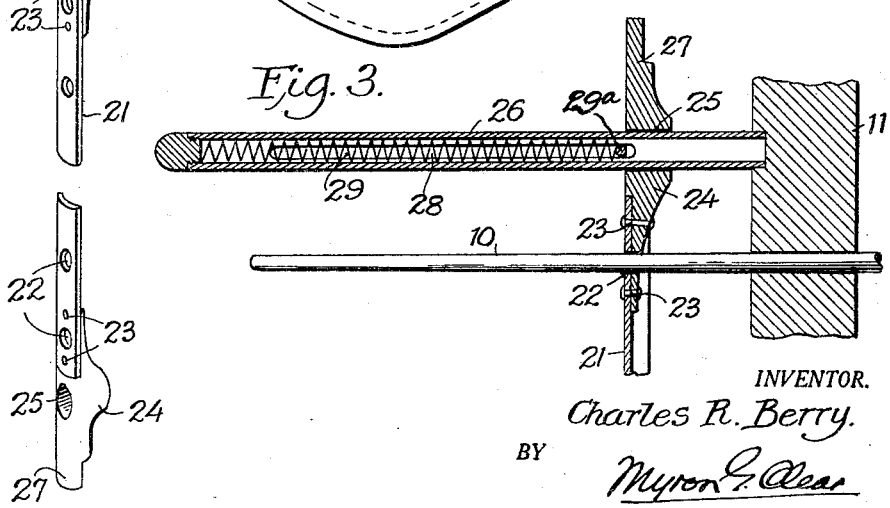
INVENTOR.
Charles R. Berry.
BY
ATTORNEY.

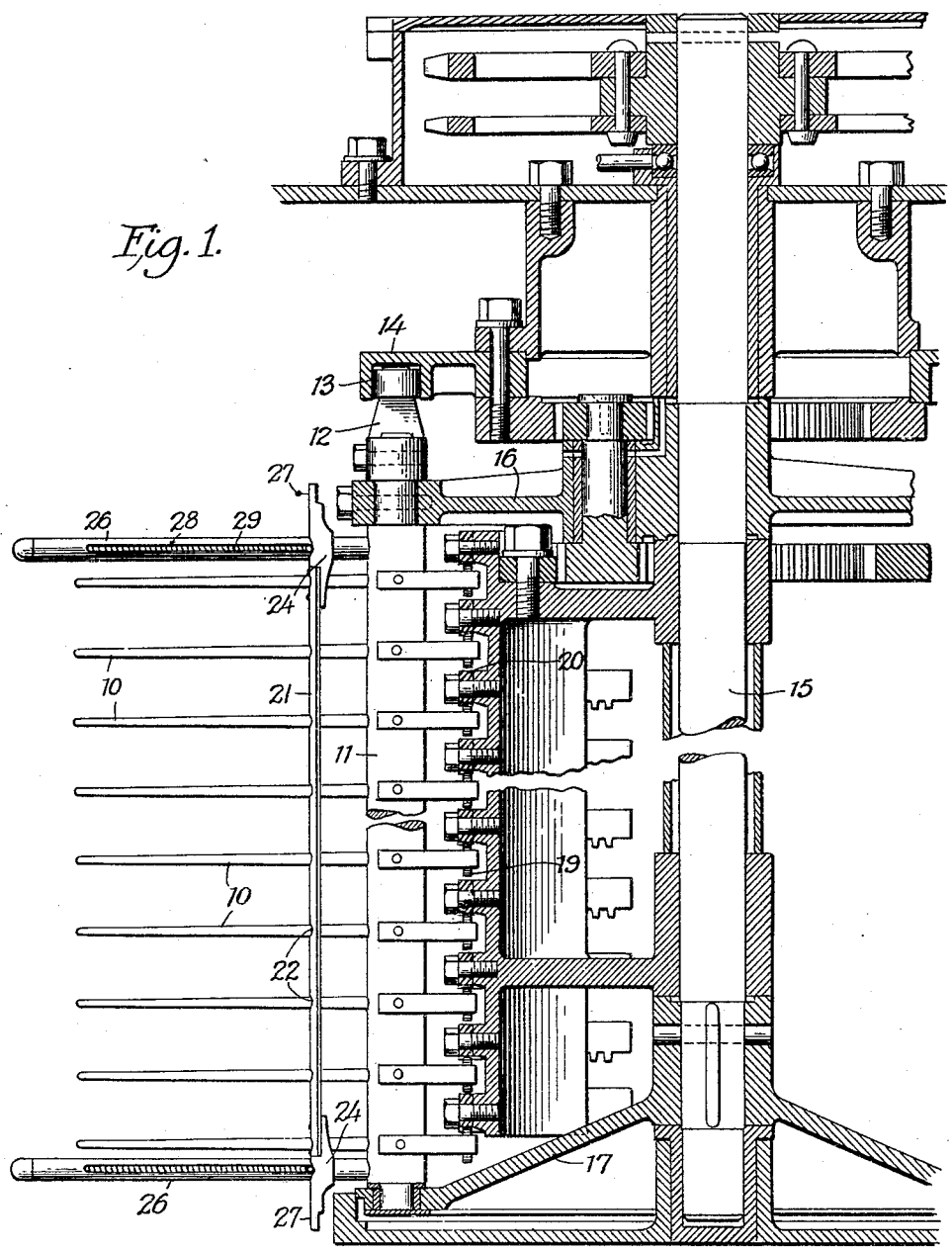

Patented June 16, 1931

1,810,411

UNITED STATES PATENT OFFICE

CHARLES R. BERRY, OF GREENVILLE, MISSISSIPPI, ASSIGNOR OF TWO-NINTHS TO EDNA IRENE BERRY, ADMINISTRATRIX OF THE ESTATE OF HIRAM N. BERRY, DECEASED, TWO-NINTHS TO HUGH A. GAMBLE, BOTH OF GREENVILLE, MISSISSIPPI, AND THREE-NINTHS TO ALBERT M. HANAUER, OF PITTSBURGH, PENNSYLVANIA

COTTON PICKER

Application filed July 27, 1928. Serial No. 295,741.

My present invention relates generally to cotton pickers of the rotary spindle type, and more particularly to the doffing or removal of cotton from the spindles after it has been picked. More especially my present invention has to do with the removal of cotton from the spindles of that character of spindle machine wherein the spindles in addition to their individual rotation and revolution as a series are shifted or swung during their revolution so as to vary their angular relation to the axis upon which they revolve.

In Patent 1,610,240, granted December 14, 1926, a doffing or stripping arrangement is disclosed wherein a stripper bar is provided for each vertical row of spindles, each stripper bar receiving the several spindles of its row in freely rotatable relation therethrough and constantly controlled by endless cam guides, so that during the revolution of the spindles around a vertical axis, the several stripper bars will be shifted lengthwise of the spindles between extreme inner and outer positions. Thus the bars will be at their inner positions at the picking station so that practically the full lengths of the spindles will be effective in the picking operation, and will be at their outer positions at the doffing station so that the picked cotton will be pushed to the ends of the spindles and may be easily removed.

In the arrangement shown in the above patent it is to be noted, however, that the several spindles remain radial to the axis of revolution of the series of spindles at all times.

It obviously becomes quite a different matter to strip cotton in an equivalent manner from the spindles of that type of machine wherein the spindles do not remain radial to the axis of revolution of the series at all times, but are controlled and actuated so that during such revolution their angles almost constantly change with respect to the radial. Such a machine is, for instance, shown in Patent 1,387,176, granted August 9, 1921, and it is to this type of machine my invention proposes such improvements as will permit of the adaptation and effective use of a stripping mechanism of the character first above described.

My invention has for its further objects, the provision of a simple, effective and durable arrangement which will be economical and of great strength, and my invention has still further objects relating to details of construction, combination and operation which may be more thoroughly understood and better appreciated from the following description, referring to the accompanying drawings.

In the drawings, which form a part of this specification,

Figure 1, is a vertical, sectional view through a picking apparatus, illustrating the practical application of my invention.

Figure 2 is a top plan view thereof, partly in section.

Figure 3 is a vertical sectional view taken through the upper portion of one of the spindle carriers and a portion of one of the stripper bars and its adjacent guide, and, Figure 4 is a detail perspective view of one of the stripper bars.

Referring now to these figures, and particularly to Figures 1 and 2, I have shown the spindles 10 supported in vertical rows, as in Patent 1,387,176 above referred to, upon cylindrical vertical carriers 11 which latter have crank arms 12 at their upper ends provided with rollers 13 engaging a stationary upper cam track 14. This arrangement serves to turn the carriers on their axes as they revolve in a series around a vertical carrier wheel shaft 15, the carriers 11 having bearings at their upper and lower portions in the carrier wheel, of which the necessary portions so far as present illustration is concerned, may be seen at 16 and 17, secured to the shaft 15.

Thus as the shaft 15 is revolved, the series of carriers 11 move with it and as the carriers revolve they are controlled by the cranks 12 and cam 14 so that they outstand in parallel relation at the picking station as shown at the left in Figure 2, while they are angularly displaced at the doffing station shown at the upper right in Figure 2.

During this operation at the doffing station the ends of the spindles pass closely adjacent to a rotating doffer 18 adapted to remove cotton from the spindle ends, and it is to be understood that, at the picking station, the several spindles are rapidly rotated upon their own axes by virtue of suitable means, for instance their gears 19 engaging racks 20.

According to my invention, a stripper bar 21 is provided for each vertical series of spindles 10, or, in other words, for each carrier 11. Each stripper bar has a series of openings 22 through which the several spindles project. Each bar 21 is moreover securely fastened at 23 at its ends to bearing brackets 24 having apertures 25 arranged to receive tubular guides 26 which outstand from the upper and lower ends of each carrier 11. The brackets 24 are sufficiently thick so as to insure free sliding movement of each stripper bar with respect to its upper and lower guides 26, and each bracket also has a vertically projecting cam engaging extension 27 for a purpose which will presently appear.

Each tubular guide 26 is longitudinally slotted as at 28 and houses a coil spring 29 whose outer end abuts a rounded end cap 30 closing the outer end of the guide. The inner end of the spring engages a cross pin 29ª oustanding at its ends through the slots 28 and bearing against the adjacent stripper bar bracket 24.

Thus the springs 29 within the tubular guides 26 serve to maintain the stripper bars 21 adjacent to the inner ends of the spindles 10 except at such times as these stripper bars are moved outwardly along the spindles by a cam operation as the carriers successively approach the doffing station.

Referring particularly to Figure 2, it will be seen that I provide a cam 31, it being understood there will be two such cams, one above, and one below, the series of spindles, located adjacent to the doffing member 18. One end of this cam is sufficiently close to the moving series of carriers 11 to engage the bracket extensions 27 of the several bearing brackets 24, while the other end of the cam is so disposed as to release the bearing brackets immediately after the successive vertical series of spindles pass the doffer 18.

Thus by the use of stripper bars I am enabled to more effectively strip cotton from the spindles than can be accomplished in other ways, and by spring controlling the stripper bars and returning the same to their normal positions adjacent to the inner ends of the spindles immediately after the cotton has been removed by the doffer from the outer ends of the spindles, I am able to avoid any interference with the remainder of the moving parts necessary with this type of cotton picker.

It is obvious, of course, that the cam 31 may be supported in a rigid manner either in connection with the supports of the doffer or some other convenient point or part of the frame of the machine.

Having thus fully described my invention, what I claim is,

1. In a cotton picker, a plurality of spindles in vertical series, a plurality of separate spindle supports revolving as a series and each rotatable on a vertical axis and supporting a single vertical series of spindles, a stripper bar adjacent each support shiftable lengthwise of the spindles thereof, a cam member for successively shifting the stripper bars outwardly along the spindles during a portion of the revolution of the supports, and means for returning each bar to the inner ends of its series of spindles upon release from said cam.

2. In a cotton picker, a series of bodily movable spindle supports rotatable upon their own vertical axes, a series of spindles carried by each support, a stripper bar shiftable on each series of spindles, cam means for moving said stripper bars in one direction, and spring means for shifting the stripper bars in the opposite direction.

3. In a cotton picker, a series of bodily movable spindle supports each rotatable on its own vertical axis, a vertical series of spindles carried by each support, a stripper bar shiftable on each series of spindles, guide means on each support for its respective stripper bar, and spring means in connection therewith for normally holding the stripper bars in inactive positions.

4. In a cotton picker, a vertical series of spindles, a rotatable and bodily movable support therefor, a stripper bar movable on said spindles, a cam for shifting said stripper bar in one direction, a spring for moving the stripper bar in the other direction, and means carried by said support for guiding the stripper bar in its movement.

5. In a cotton picker, a vertical series of spindles, a rotatable and bodily movable support therefor having outstanding guides, a stripper bar movable on said spindles and having portions slidably engaging said guides, and spring means in connection with said guides for urging the stripper bar toward the support.

6. In a cotton picker, a vertical series of spindles, a rotatable and bodily movable support therefor having outstanding slotted guides, a stripper bar movable on said spindles and having portions slidably engaging said guides, and springs housed within said guides and having means engaging the stripper bar for urging the latter inwardly toward the support.

7. In a cotton picker having rotatable spindles arranged in vertical series, and a bodily movable and rotatable support for each series of spindles, a stripper bar for each support shiftable on the spindles thereof, a cam for shifting said bar outwardly along the spindles, and means carried by each support for guiding its stripper bar during shifting thereof and holding the same yieldingly adjacent to the inner ends of the spindles when free of said cam.

In testimony whereof I affix my signature.

CHARLES R. BERRY.